Feb. 21, 1950 L. G. STINE ET AL 2,498,016
RECEPTACLE FOR ICE CREAM CARTONS
Filed Nov. 13, 1947 2 Sheets-Sheet 1
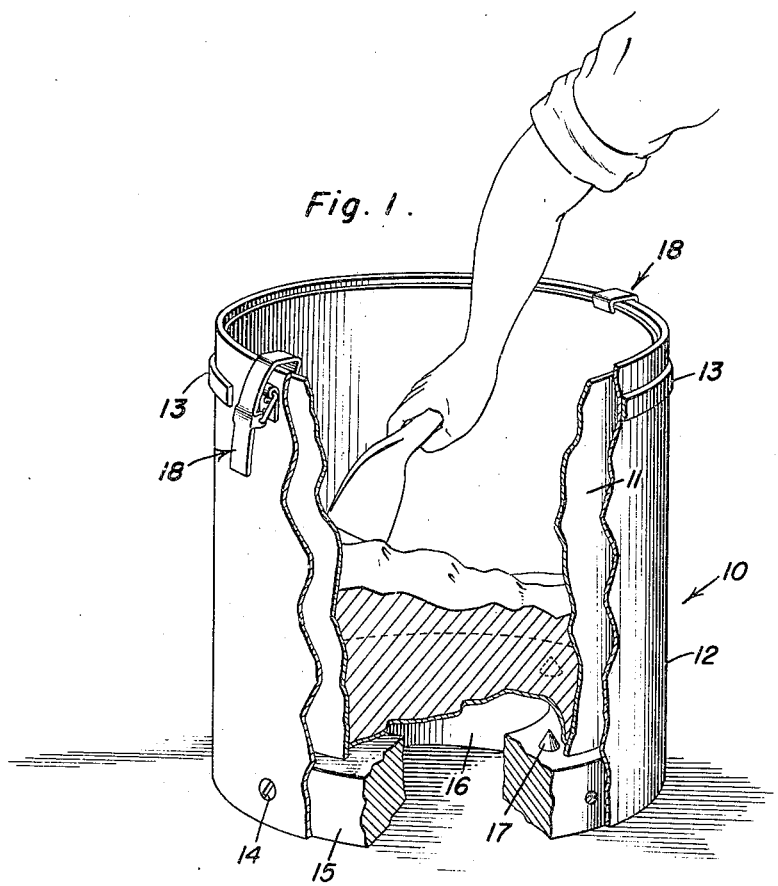
Fig. 1.
Fig. 4.
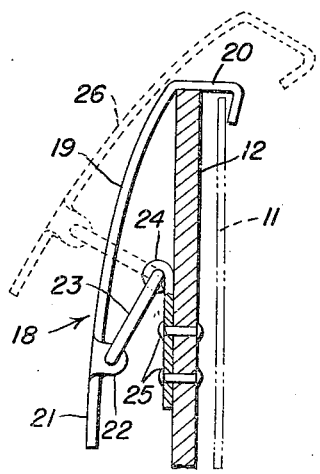
Lester G. Stine
Charles A. Hurst, Jr.
INVENTORS

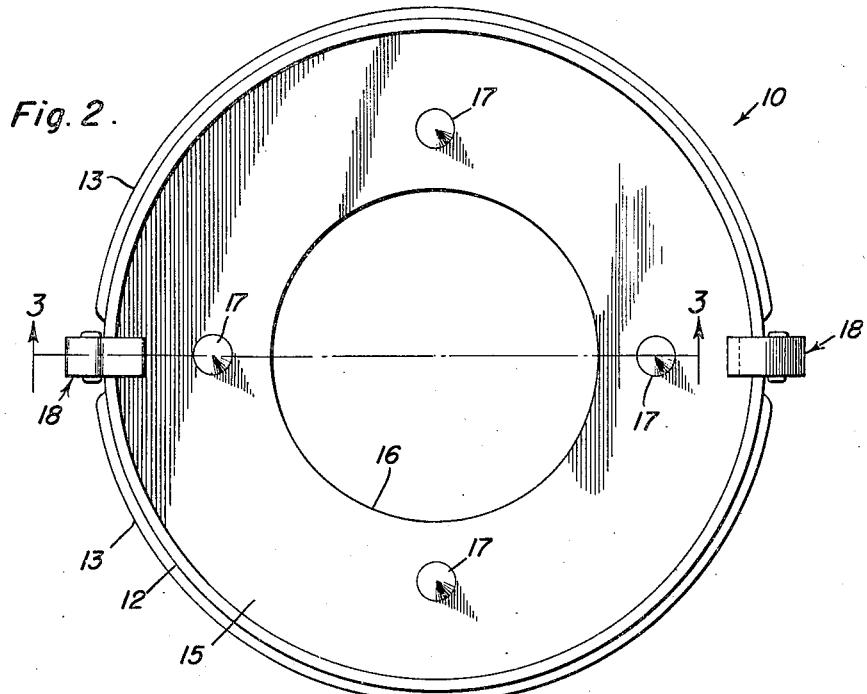
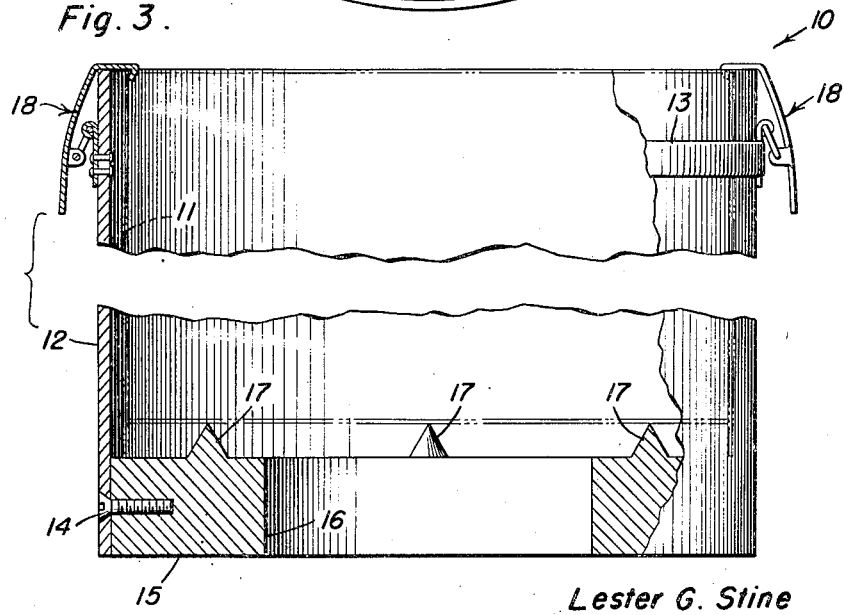

Patented Feb. 21, 1950

2,498,016

UNITED STATES PATENT OFFICE 2,498,016

RECEPTACLE FOR ICE CREAM CARTONS

Lester G. Stine and Charles A. Hurst, Jr., Harrisburg, Pa.

Application November 13, 1947, Serial No. 785,768

1 Claim. (Cl. 220—15)

This invention relates to new and useful improvements and structural refinements in receptacles for ice cream cartons, more specifically, cartons of the type commonly used and supplied by ice cream manufacturers to their retail dealers, who, in turn, dispense the contents thereof by means of a suitable scoop.

These cartons, usually made of cardboard, are stored by the retail dealer in a refrigerated compartment until such time as the contents thereof are exhausted, and it has been found that during such storage, the carton becomes damp and unable to withstand the scraping of the scoop, particularly when the ice cream is hard.

Moreover, the cartons are not properly supported in the refrigerated cabinet, and frequently rotate or are lifted upwardly when an effort is made to remove ice cream therefrom by means of the scoop.

It is, therefore, a principal object of the invention to eliminate the disadvantages above outlined by providing what may be referred to as a receptacle for the ice cream container or carton, which receptacle will not only reinforce the carton itself, but will also retain the same in a stable, secured position, so that the contents thereof may be removed without difficulty.

Another object of the invention is to provide a receptacle for ice cream cartons wherein the cartons may be quickly and easily applied or removed.

A further object of the invention is to provide a receptacle of the class described, which is simple in construction, light in weight, and which will readily lend itself to economical manufacture.

A still further object of the invention is to provide a receptacle which will not easily become damaged and which is otherwise well adapted for the purpose for which it is intended.

With the above more important objects in view and such other objects as may become apparent as this specification proceeds, the invention consists essentially of the construction and arrangement of parts as shown in the accompanying drawings in which—

Figure 1 is a perspective view of the invention, the same being partly broken away to reveal its construction;

Figure 2 is a top plan view of the receptacle;

Figure 3 is a cross-sectional view, taken substantially in the plane of the line 3—3 in Figure 2, and;

Figure 4 is a fragmentary cross-sectional detail, emphasizing the construction of one of the clamps used in the invention.

Like characters of reference are employed to designate like parts in the specification and throughout the several views.

Referring now to the accompanying drawings in detail, the invention consists of a receptacle for ice cream cartons, the receptacle being designated generally by the reference character 10, while the carton which it is intended to receive is indicated at 11.

The receptacle 10 embodies in its construction a tubular shell 12, the upper end portion of which is reinforced by means of a pair of arcuate, circumferential bands 13, while the lower end portion of the shell is secured by means of suitable screws 14 to a disc-like bottom 15.

It will be observed that the upper end of the shell 12 is open, and that the bottom 15 is contained within the lower end portion of the shell, as is best shown in Figures 1 and 3.

For sake of lightness and also, in order to facilitate drainage, the bottom 15 is formed with a central opening 16, and a plurality of upwardly projecting, pointed teeth 17 are provided on the bottom 15, as will be clearly apparent.

The carton 11 is, of course, removably receivable within the shell 12, and it will be noted that the teeth 17 engage the bottom of the carton and thereby prevent the latter from turning when the ice cream scoop is applied to its contents.

Means are also provided for preventing the carton 11 from lifting upwardly from the shell 12, said means consisting of a pair of clamps designated generally by the reference character 18. These clamps are disposed at the diametrically opposite sides of the shell 12 at the upper edge portion of the latter, intermediately of the reinforcing bands 13. The two clamps are similar in construction, so that a description of one will suffice for both.

Each of the clamps 18 consists of a strip or finger 19, one end portion of which is angulated to provide a hook-shaped extremity 20, while the remaining end portion of the finger constitutes what may be referred to as a finger piece or handle 21.

A pair of spaced ears 22 are provided on the mid-portion of the finger 19 which swingably receive one end portion of an eye-shaped link 23, the relatively opposite end portion of which pivots in a suitable bracket 24, secured to the shell 12 as at 25.

It will be observed that the hook portion 20 of the finger 19 extends over the upper edge of the shell 12 and normally engages the upper edge portion of the carton 11, as shown. However, when it is desired to remove the carton from the receptacle, the finger 19 may be disengaged from the carton by simply grasping the finger piece 21 and moving the finger to a position illustrated by the phantom lines 26.

It may be added that if desired, the finger 19 may possess sufficient resiliency so that it is normally in its lowered position, in engagement with the carton 11.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In association with an ice cream carton and a shell therefor, a clamp comprising a bracket secured to the outer surface of the shell and having one edge portion thereof arcuated to form a tubular bearing, an arcuate arm provided intermediate its ends with a pair of transversely aligned ears, a substantially rectangular link having one end portion thereof rotatable in said bearing and its opposite end portion pivotally mounted in said ears, one end portion of said arm constituting a finger piece, the remaining end portion of said arm being angulated to extend over the upper edges of said shell and carton and terminating in an inturned detent, the angulated portion of said arm being engageable with the upper edge of said shell when said finger piece is brought to an ultimate clamped position.

LESTER G. STINE.
CHARLES A. HURST, Jr.

REFERENCES CITED

The following references are of record in the file of this patent:

UNITED STATES PATENTS

| Number | Name | Date |
|---|---|---|
| 665,349 | Sewall | Jan. 1, 1901 |
| 939,865 | Scheck | Nov. 9, 1909 |
| 2,328,003 | Gardes | Aug. 31, 1943 |
| 2,350,075 | Smith et al. | May 30, 1944 |